(12) United States Patent  (10) Patent No.: US 8,271,114 B2
Lydon et al.  (45) Date of Patent: Sep. 18, 2012

(54) PROTOCOL FOR REMOTE USER INTERFACE FOR PORTABLE MEDIA DEVICE

(75) Inventors: Gregory T. Lydon, Santa Cruz, CA (US); Lawrence G. Bolton, Fremont, CA (US); Emily Clark Schubert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1056 days.

(21) Appl. No.: 12/200,651

(22) Filed: Aug. 28, 2008

(65) Prior Publication Data
US 2009/0062947 A1 Mar. 5, 2009

Related U.S. Application Data

(60) Provisional application No. 60/969,948, filed on Sep. 4, 2007.

(51) Int. Cl.
*G06F 17/00* (2006.01)
(52) U.S. Cl. .............. 700/94; 710/8; 710/303; 710/304; 707/610; 707/611; 707/612
(58) Field of Classification Search ..................... 700/94
See application file for complete search history.

(56) References Cited

U.S. PATENT DOCUMENTS

| 5,964,847 | A | 10/1999 | Booth, III et al. |
| 5,986,979 | A | 11/1999 | Bickford et al. |
| 6,232,539 | B1 | 5/2001 | Looney et al. |
| 6,725,061 | B1 | 4/2004 | Hutchison, IV et al. |
| 6,728,729 | B1 | 4/2004 | Jawa et al. |
| 6,879,843 | B1 | 4/2005 | Kim |
| 7,167,935 | B2 | 1/2007 | Hellberg |
| 7,187,947 | B1 | 3/2007 | White et al. |
| 7,293,122 | B1 | 11/2007 | Schubert et al. |

(Continued)

FOREIGN PATENT DOCUMENTS

GB 2405718 A 3/2005

(Continued)

OTHER PUBLICATIONS

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

(Continued)

*Primary Examiner* — Paul McCord
(74) *Attorney, Agent, or Firm* — Kilpatrick Townsend & Stockton LLP

(57) ABSTRACT

Remote user interfaces for portable media devices provided improved access by accessories to media assets and metadata stored in a database of a portable media device, enhancing a user's ability to control operation of the portable media device using a remote user interface provided by the accessory. In one example, an accessory can determine whether the database of the portable media device was updated while the portable media device was disconnected from the accessory. In a second example, an accessory can create and manage a playlist for the portable media device and can incorporate into the playlist tracks already queued for playback when the accessory connects to the portable media device. In a third example, an accessory can obtain database navigation history and initialize a database navigation interface to match the database navigation history.

25 Claims, 7 Drawing Sheets

U.S. PATENT DOCUMENTS

| | | | |
|---|---|---|---|
| 7,299,304 | B2 | 11/2007 | Saint-Hilaire et al. |
| 7,765,326 | B2 * | 7/2010 | Robbin et al. ............... 709/248 |
| 7,823,214 | B2 * | 10/2010 | Rubinstein et al. ............ 726/34 |
| 7,835,809 | B2 * | 11/2010 | Griffin, Jr. ...................... 700/94 |
| 2002/0010759 | A1 | 1/2002 | Hitson et al. |
| 2002/0132651 | A1 | 9/2002 | Jinnouchi |
| 2002/0151327 | A1 | 10/2002 | Levitt |
| 2002/0173273 | A1 | 11/2002 | Spurgat et al. |
| 2002/0197955 | A1 | 12/2002 | Witkowski et al. |
| 2003/0079038 | A1 | 4/2003 | Robbin et al. |
| 2004/0019497 | A1 | 1/2004 | Volk et al. |
| 2004/0170386 | A1 | 9/2004 | Mikawa |
| 2004/0242224 | A1 * | 12/2004 | Janik et al. ................. 455/426.1 |
| 2004/0267825 | A1 | 12/2004 | Novak et al. |
| 2007/0050458 | A1 | 3/2007 | Rotzoll et al. |
| 2007/0056013 | A1 | 3/2007 | Duncan |
| 2007/0077784 | A1 | 4/2007 | Kalayjian et al. |
| 2007/0086724 | A1 | 4/2007 | Grady et al. |
| 2007/0156779 | A1 | 7/2007 | Ho et al. |
| 2007/0226384 | A1 | 9/2007 | Robbin et al. |
| 2009/0059512 | A1 | 3/2009 | Lydon et al. |
| 2009/0060225 | A1 | 3/2009 | Lydon et al. |

FOREIGN PATENT DOCUMENTS

| | | |
|---|---|---|
| WO | WO 00/60450 A1 | 10/2000 |
| WO | WO 03/036541 A1 | 5/2003 |
| WO | WO 03/036957 A1 | 5/2003 |
| WO | WO 2004/084413 A | 9/2004 |
| WO | WO 2005/115107 A | 12/2005 |
| WO | WO 2005/116892 A1 | 12/2005 |
| WO | WO 2006/007084 A1 | 1/2006 |
| WO | WO 2008/004045 A1 | 1/2008 |
| WO | WO 2008/085869 A2 | 7/2008 |
| WO | WO 2009/032708 A2 | 3/2009 |

OTHER PUBLICATIONS

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

UK Intellectual Property Office Search Report GB0815716.6 dated Nov. 27, 2008.

UK Intellectual Property Office Search Report GB0815718.2 dated Nov. 27, 2008.

UK Intellectual Property Office Search Report GB0815719.0 dated Nov. 28, 2008.

iPod Classic User's Guide, acquired from apple.com, 2002; 44 pages.

"Neuros MP3 Digital Audio Computer," www.neurosaudio.com, downloaded Apr. 9, 2003, 6 pages Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

International Search Report PCT/US2008/074505 mailed Apr. 7, 2009.

Non-Final Office Action of Aug. 23, 2011 for U.S. Appl. No. 12/200,668; 30 pages.

Interview Summary of Jun. 7, 2011 for U.S. Appl. No. 12/200,668; 3 pages.

Non-Final Office Action of Mar. 3, 2011 for U.S. Appl. No. 12/200,668; 32 pages.

Combine Search and Examination Report under Sections 17 and 18(3) of Mar. 3, 2010 for GB Patent Application No. GB1001445.4, 5 pages.

Non-Final Office Action of Dec. 8, 2011 for U.S. Appl. No. 12/200,668; 38 pages.

* cited by examiner

PROTOCOL FOR REMOTE USER INTERFACE FOR PORTABLE MEDIA DEVICE

CROSS-REFERENCES TO RELATED APPLICATIONS

This application claims the benefit of U.S. Provisional Patent Application No. 60/969,948, filed Sep. 4, 2007, entitled "Protocol For Remote User Interface," which disclosure is incorporated herein by reference in its entirety.

FIELD OF THE INVENTION

The present invention relates generally to portable media devices such as media players and accessories and in particular to a protocol allowing an accessory to provide a remote user interface for a portable media device.

BACKGROUND OF THE INVENTION

A portable media device can store media assets, such as audio tracks, video tracks or photos that may be played or displayed on the portable media device. Examples of portable media devices are the iPod® and the iPhone™ portable media devices, which are available from Apple Inc. of Cupertino, Calif. Often, a portable media device acquires its media assets from a host computer that serves to enable a user to manage media assets. As an example, the host computer may execute a media management application to manage media assets. One example of a media management application is iTunes®, produced by Apple Inc.

A portable media device typically includes one or more connectors or ports that may be used to interface with other devices. For example, the connector or port may enable the portable media device to couple to a host computer, be inserted into a docking system, or receive an accessory device. In the case of the iPod®, for example, a vast array of accessory devices have been developed that may interconnect to the portable media device. For example, a remote control may be connected to the connector or port to allow the user to remotely control the portable media device. As another example, an automobile may include a connector and the portable media device may be inserted onto the connector such that an automobile media system may interact with the portable media device, thereby allowing the media content on the portable media device to be played within the automobile. In another example, a digital camera may be connected to the portable media device to download images and the like.

Portable media devices commonly connect with remote devices for playback or presentation of media assets stored on the portable media device. A user may want to dock a portable media device to a home stereo system (or in-vehicle stereo system), for example, and play back songs stored on the portable media device but with sound experience provided by the home stereo system. In such situations, it is convenient for the user to be able to operate the portable media device remotely, e.g., using controls of the home stereo system or a remote control device that communicates with the home stereo system.

It has been known to provide a remote user interface for a portable media device via an accessory. A communication protocol is provided, via which the accessory and the portable media device can exchange instructions and information. Using suitable command signals, the accessory can invoke the playback functions of the portable media device and can obtain certain information about media assets stored on the portable media device.

BRIEF SUMMARY OF THE INVENTION

Existing remote user interface protocols, while enhancing convenience, do not provide all of the functionality that would be available through the user interface of a portable media device. For example, such protocols do not provide the ability to create or modify a playlist on the fly via the remote user interface. As another example, existing protocols do not allow the accessory's remote user interface to initialize in the same state that the portable media device's user interface had at the time the portable media device was connected to the accessory. Thus, for instance, if the user selects a media asset or group of assets for playback via the portable media device's own interface and thereafter connects the portable media device to the accessory, the remote interface does not present the same state of the database navigation process; the user has to begin again at the starting point of database navigation. Such discontinuities in interface state can make the transition from the portable media device's interface to the remote interface awkward and non-intuitive for the user.

The present invention relates to remote user interfaces with improved remote access by an accessory to media assets and metadata stored in a database of a portable media device, enhancing a user's ability to control operation of the portable media device using a remote user interface provided by the accessory. In one embodiment, each time the portable media device re-connects to the accessory, the accessory can determine whether the database of the portable media device was updated while the portable media device was disconnected from the accessory. Consequently, the accessory can cache information obtained from the portable media device and can continue to use cached information across multiple connection/disconnection cycles, for at least as long as the database is not updated. This can reduce the burden on the communication path between the accessory and the portable media device by reducing redundant requests for information.

In another embodiment, the accessory can be used to manage a remote playlist for the portable media device. The remote playlist can be created, modified, and deleted on the fly by the user interacting with the remote user interface provided by the accessory. The accessory can provide user selections from the database to the portable media device and instruct the portable media device to add the selections to the remote playlist; the selections can include a single media asset or a group of media assets (e.g., all songs on an album). The accessory can create the remote playlist starting from an empty list or from a list of media assets that were queued for playback at the time the portable media device became connected to the accessory.

In another embodiment, the accessory can obtain database selection history information from the portable media device. For example, if the portable media device becomes connected to the accessory at a time when one or more media assets are queued for playback in the portable media device, the portable media device can provide the accessory with information about the queued media assets and also information about a navigational path that the user followed to select the queued media assets via the portable media device's own user interface. The accessory can then initialize the remote user interface into the same state, for purposes of database navigation, as the portable media device's own user interface. The result can be a more seamless transition for the user from using the portable media device's interface to communicating with the portable media device via the remote user interface of the accessory.

The following detailed description together with the accompanying drawings will provide a better understanding of the nature and advantages of the present invention.

DETAILED DESCRIPTION OF THE INVENTION

A remote user interface provides improved remote access by an accessory to media assets and metadata stored in a database of a portable media device, enhancing a user's ability to control operation of the portable media device using a remote user interface provided by the accessory. In one embodiment, each time the portable media device re-connects to the accessory, the accessory can determine whether the database of the portable media device was updated while the portable media device was disconnected from the accessory. Consequently, the accessory can cache information obtained from the portable media device and can continue to use cached information across multiple connection/disconnection cycles, for at least as long as the database is not updated. This can reduce the burden on the communication path between the accessory and the portable media device by reducing redundant requests for information.

In another embodiment, the accessory can be used to manage a remote playlist for the portable media device. The remote playlist can be created, modified, and deleted on the fly by the user interacting with the remote user interface provided by the accessory. The accessory can provide user selections from the database to the portable media device and instruct the portable media device to add the selections to the remote playlist; the selections can include a single media asset or a group of media assets (e.g., all songs on an album). The accessory can create the remote playlist starting from an empty list or from a list of media assets that were queued for playback at the time the portable media device became connected to the accessory.

In another embodiment, the accessory can obtain database selection history information from the portable media device. For example, if the portable media device connects to the accessory at a time when one or more media assets are queued for playback in the portable media device, the portable media device can provide the accessory with information about the queued media assets and also information about a navigational path that the user followed to select the queued media assets via the portable media device's own user interface. The accessory can then initialize the remote user interface into the same state, for purposes of database navigation, as the portable media device's own user interface. The result can be a more seamless transition for the user from using the portable media device's interface to communicating with the portable media device via the remote user interface of the accessory.

System Overview

Figure 1A:
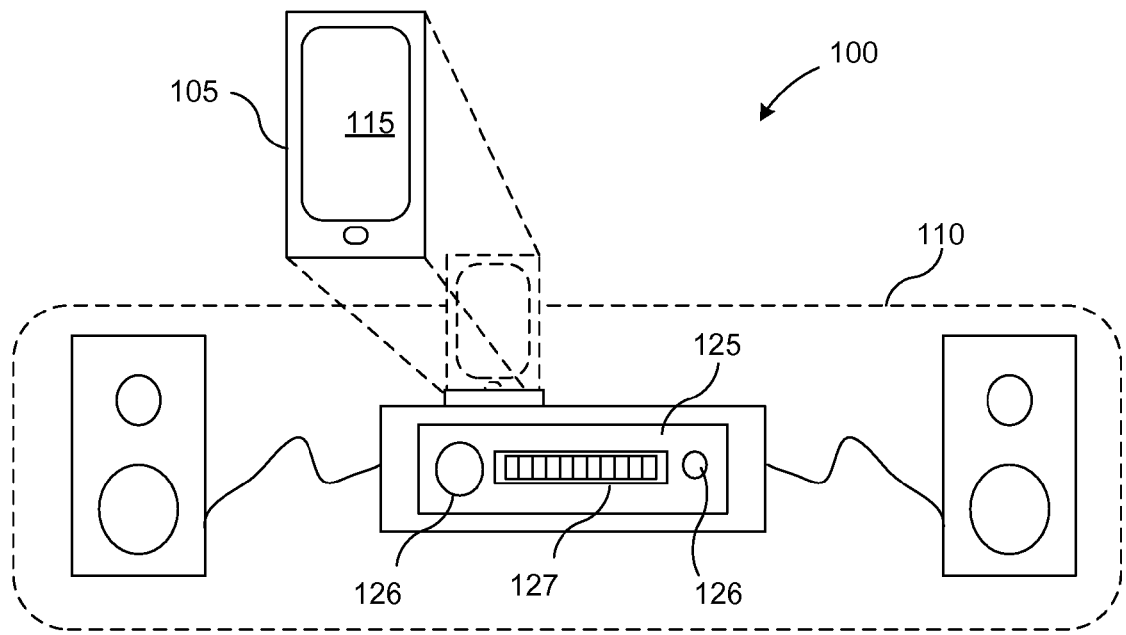
FIGS. 1A and 1B illustrate docking of a portable media device ("PMD") and an entertainment system to provide a remote user interface for a PMD according to embodiments of the present invention.

FIG. 1A illustrates portable media device ("PMD") 105 that can be docked with entertainment system 110 according to an embodiment of the present invention. Entertainment system 110 may be, e.g., a home audio system, a home theater system, an in-vehicle audio system, or the like. PMD 105 in this embodiment has a user interface that includes touch screen 115, which displays information and responds to pressure by the user to receive user input. It is to be understood that other user interfaces and user interface components may be substituted.

Entertainment system 110 includes user interface 125, which can include, e.g., control knobs 126 and display device 127. Display device 127 can be a text-based display as shown, graphical or video display, or the like. In accordance with an embodiment of the present invention, while PMD 105 is docked with entertainment system 110, a user can operate PMD 105 by operating control knobs 126 and can obtain information about the current state of PMD 105 by viewing display 127.

Figure 1B:
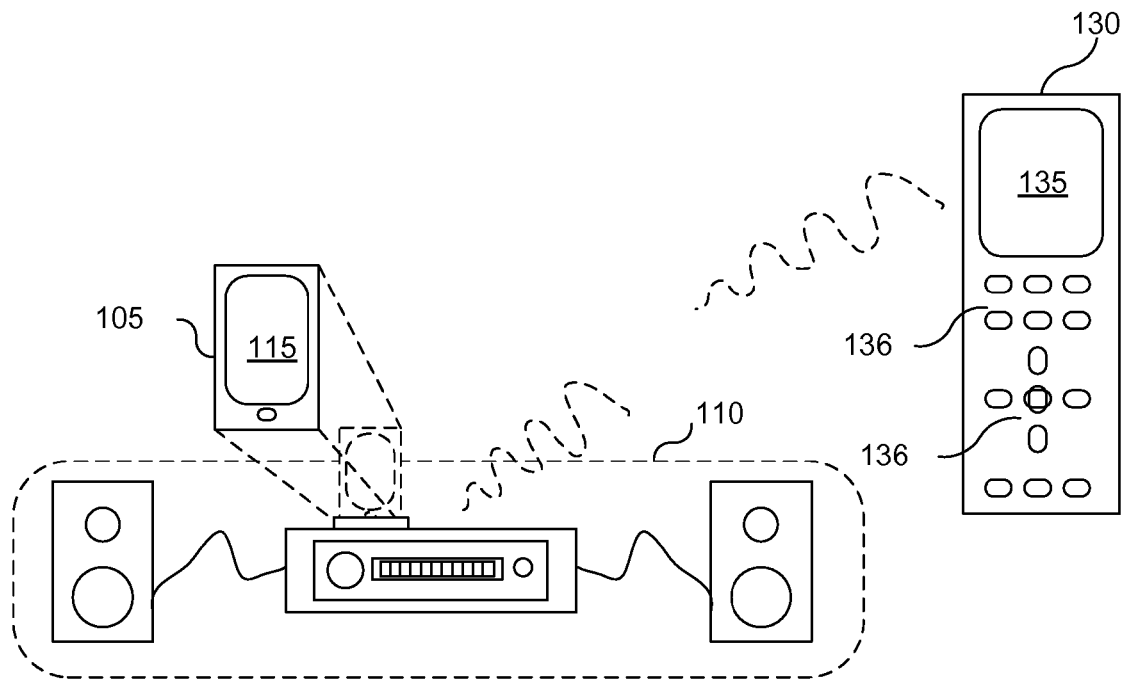

FIG. 1B illustrates an embodiment in which entertainment system 110 can be operated by remote control unit 130, which communicates wirelessly (e.g., using radio frequency or infrared signaling) with entertainment system 110. Remote control unit 130 includes display screen 135 and control buttons 136 (or other input devices). In accordance with another embodiment of the present invention, while PMD 105 is docked with entertainment system 110, a user can operate PMD 105 by operating control buttons 136 or other user input controls that may be present on remote control unit 130 and can obtain information about the current state of PMD 105 by viewing display screen 135. It will be appreciated that the system configurations of FIGS. 1A and 1B are illustrative and that variations and modifications are possible. Any type of accessory that provides a user interface with user input controls and a display (or other device capable of communicating interface-related feedback to the user) can be used in connection with the present invention.

Figure 2:
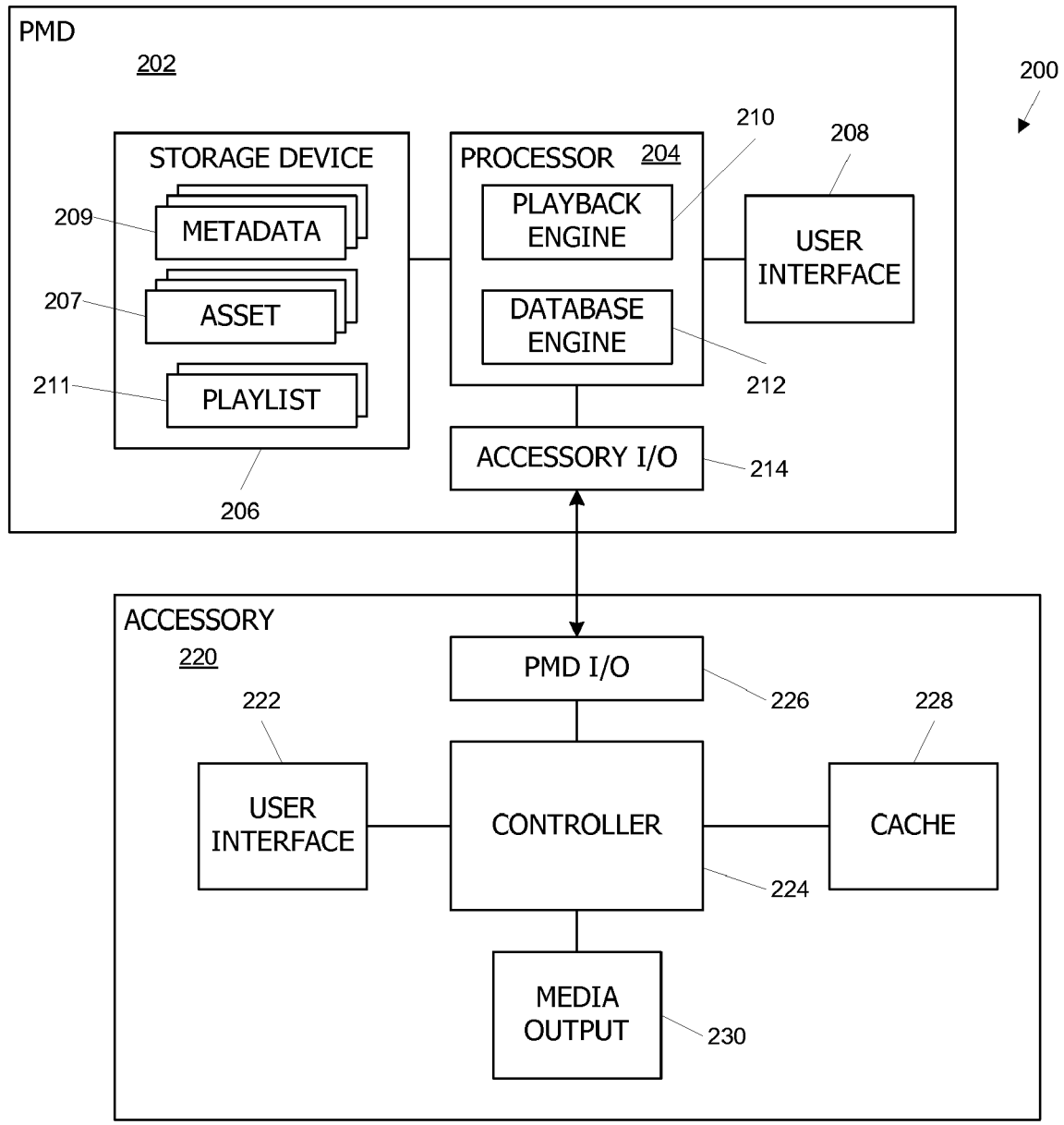
FIG. 2 is a block diagram of a system including a PMD and accessory according to an embodiment of the present invention.

FIG. 2 is a block diagram of system 200 according to an embodiment of the present invention. System 200 can include PMD 202 (e.g., implementing PMD 105 of FIGS. 1A and 1B) and an accessory 220 (e.g., implementing entertainment system 110 of FIGS. 1A and 1B).

PMD 202 in this embodiment can provide media player capability. PMD 202 can include processor 204, storage device 206, user interface 208, and accessory input/output (I/O) interface 214. Processor 204 in this embodiment can implement playback engine 210 and database engine 212, e.g., as software programs executed by processor 204.

Storage device 206 may be implemented, e.g., using disk, flash memory, or any other non-volatile storage medium. In some embodiments, storage device 206 can store media assets 207 (also referred to herein as "tracks"), such as audio, video, still images, or the like, that can be played by host device 202. Storage device 206 can implement a database that stores media assets 207 and also stores metadata records 209 associated with each media asset 207. The metadata record 209 for a given asset can include various fields, e.g., a media type (audio track, video track, audio book, still image, etc.); an asset title; a name of an artist or performer associated with the asset; composer or author information; asset length; chapter information; album information; lyrics; information about associated artwork or images; description of the asset; and so on. The database can also include "playlists" 211, which are lists of assets that can be played sequentially by playback engine 210. Playlists can include user-created playlists and/or automatically generated playlists. (It is to be understood that playback engine 210 can also have the capability to "shuffle" a playlist 211 and play the tracks of the playlist in a random order; user interface 208 can be used to turn shuffle on or off.)

Storage device 206 can also store other information such as information about a user's contacts (names, addresses, phone numbers, etc.); scheduled appointments and events; notes; and/or other personal information. In still other embodiments, storage device 206 can store one or more programs to be executed by processor 204 (e.g., video game programs, personal information management programs, programs implementing playback engine 210 and/or database engine 212, etc.).

User interface 208 may include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 208 to invoke the functionality of PMD 202 and can view and/or hear output from PMD 202 via user interface 208.

Processor 204, which can be implemented as one or more integrated circuits (e.g., a conventional microprocessor or microcontroller), can control the operation of PMD 202. For example, in response to user input signals provided by user interface 208, processor 204 can operate database engine 212 to navigate a database of assets 207 stored in storage device 206 in response to user input and can display lists of selected assets 207 using some or all of the associated metadata 209 to identify each selected asset 207. Processor 204 can respond to user selection of an asset 207 by transferring asset information to playback engine 210. Playback engine 210 can play an asset 207 or a playlist 211 of assets; assets to be played can be selected by the user interacting with database engine 212. In some embodiments, playback engine 210 can also store and play a temporary playlist (e.g., an "on the go" playlist as supported in certain iPod® media players) created by the user interacting with user interface 208.

Accessory I/O interface 214 can allow PMD 202 to communicate with various accessories. For example, accessory I/O interface 214 might support connections to an external speaker dock, a radio (e.g., FM, AM and/or satellite) tuner, an in-vehicle entertainment system, an external video device, or the like. In one embodiment, accessory I/O interface 214 includes a 30-pin connector corresponding to the connector used on iPod® products manufactured and sold by Apple Inc. Alternatively or additionally, accessory I/O interface 214 can include a wireless interface (e.g., Bluetooth or the like).

In some embodiments, PMD 202 can also use accessory I/O interface 214 to communicate with a host computer (not explicitly shown) that executes a media asset management program (such as the iTunes® media asset management program distributed by Apple Inc.). The media asset management program can enable a user to add media assets 207 to PMD 202 and/or remove media assets from PMD 202. The user can also update metadata 209 associated with media assets 207 on PMD 202. In some embodiments, the user can also interact with the media asset management program to create and update playlists 211. In one embodiment, the host computer maintains a master database of media assets (including associated metadata and playlists), and the media asset management program synchronizes the master database with the database maintained on storage device 206 of PMD 202 automatically whenever PMD 202 connects to the host computer.

Accessory 220 includes controller 224, user interface 222, PMD I/O interface 226, cache 228, and media output device 230. Controller 224 can include, e.g., a microprocessor or microcontroller executing program code to perform various functions such as digital audio decoding, analog or digital audio and/or video processing, and the like. User interface 222 may include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). Alternatively, output components of user interface 222 can be integrated with media output device 230. A user can operate the various input controls of user interface 222 to invoke the functionality of accessory 220 and can view and/or hear output from accessory 220 via user interface 222. In addition, a user can operate PMD 202 via user interface 222.

PMD I/O interface 226 can allow accessory 220 to communicate with PMD 202 (or another PMD). Examples are described below.

Cache 228, which can be implemented using volatile and/or nonvolatile memory provides storage for various information including information obtained from PMD 202. For example, as described below, accessory 220 can obtain some or all of metadata 209 and/or playlists 211 from PMD 202. Any or all of this information can be stored in cache 228. Caching of information obtained from PMD 202 by accessory 220 is optional; where used, caching can help speed up performance of accessory 220 by avoiding repeated requests for information from PMD 202.

Media output device 230, which can be implemented, e.g., as one or more integrated circuits, provides the capability to output various types of media. For example, media output device 230 can include a display screen or a driver circuit and connector for an external display screen, thereby enabling video and/or still images to be presented to a user. Additionally or instead, media output device 230 can also include one or more speakers or driver circuits and connectors for external speakers, thereby enabling audio to be presented to a user. In one embodiment, controller 224 can receive media content signals from PMD 202 via PMD I/O interface 226 and can provide the signals with or without further processing to media output device 230; media output device 230 can transform the signals as appropriate for presentation to the user.

Accessory 220 can be any accessory that provides a user interface suitable to navigating a database. Examples of accessories implementing accessory 220 include, e.g., an external speaker dock, a radio (e.g., FM, AM and/or satellite) tuner, an in-vehicle entertainment system, an external video device, or the like. In one embodiment, PMD I/O interface 226 includes a 30-pin connector that mates with the connector used on iPod® products manufactured and sold by Apple Inc. PMD I/O interface 226 can also include other types of connectors, e.g., Universal Serial Bus (USB) or FireWire connectors. Alternatively, PMD I/O interface 226 can include a wireless interface (e.g., Bluetooth or the like).

It will be appreciated that the system configurations and components described herein are illustrative and that variations and modifications are possible. The PMD and/or accessory may have other capabilities not specifically described herein.

Protocol Overview

Accessory I/O interface 214 of PMD 202 and PMD I/O interface 226 of accessory 220 allow PMD 202 to be connected to accessory 220 and subsequently disconnected from accessory 220. As used herein, PMD 202 and accessory 220 are "connected" whenever a communication channel between accessory I/O interface 214 and PMD I/O interface 226 is open and are "disconnected" whenever the communication channel is closed. Connection can be achieved by physical attachment (e.g., between respective mating connectors of PMD 202 and accessory 220), by an indirect connection such as a cable, or by establishing a wireless communication channel. Similarly, disconnection can be achieved by physical detachment, disconnecting a cable, powering down accessory 220 or PMD 202, or closing the wireless communication channel. Thus, a variety of communication channels may be used, including wired channels such as USB, FireWire, or universal asynchronous receiver/transmitter ("UART"), or wireless channels such as Bluetooth.

Regardless of the particular communication channel, as long as PMD 202 and accessory 220 are connected to each other, the devices can communicate by exchanging commands and data according to a protocol. The protocol defines a format for sending messages between PMD 202 and accessory 220. For instance, the protocol may specify that each message is sent in a packet with a header and an optional payload. The header provides basic information (e.g., a start indicator, length of the packet, and a command to be processed by the recipient), while the payload provides any data associated with the command; the amount of associated data can be different for different commands, and some commands may provide for variable-length payloads. In some embodiments, the commands may be defined such that a particular command is valid in only one direction. The packet can also include error-detection or error-correction codes as known in the art.

The protocol can define a number of "lingoes," where a "lingo" is a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all PMDs to which an accessory can be connected, support every lingo defined within the protocol.

In some embodiments, every accessory 220 and every PMD 202 that are designed to be interoperable with each other support at least a "general" lingo that includes commands common to all such devices. The general lingo can include commands enabling the PMD and the accessory to identify and authenticate themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) may be blocked from invoking certain commands or lingoes if the authentication is unsuccessful.

A command protocol supported by PMD 202 and accessory 220 can include a "remote user interface" lingo (or other group of commands) that can be used to communicate commands and data related to permitting a user to control the operation of PMD 202 by operating accessory 220. The remote user interface lingo can include commands that accessory 220 can send to PMD 202 to start and stop playback; to obtain information about a currently playing media asset (also referred to herein as a "track"); to interact with database engine 212 to navigate the database of media assets stored in PMD 202 and select a track or group of tracks to be played; and to control various settings (e.g., equalizer, audio book speed, etc.) of PMD 202. Such functionality has been implemented in a remote user interface lingo of previous iPod® media players.

Embodiments of the present invention provide enhanced capability to control PMD 202 via a remote user interface lingo (or other group of commands).

Detecting Intervening Synchronization

In some embodiments, accessory 220 may cache database information from PMD 202, including metadata 209 related to all or some of media assets 207, e.g., in cache 228. Previously, when PMD 202 was disconnected from accessory 220, any cache maintained by accessory 220 would become invalid. This was necessary because the database of PMD 202 can be updated (e.g., through synchronizing with a host computer) while PMD 202 is disconnected from accessory 220; accessory 220 had no way to determine whether any update had occurred.

One embodiment of the present invention allows accessory 220 to determine whether PMD 202 did or did not update its database while it was disconnected from accessory 220. The remote user interface lingo can include the following commands that can be invoked, e.g., when PMD 202 becomes connected:

(1) A GetDBSyncInfo command, sent by accessory 220 to PMD 202 to request information related to the last synchronization of PMD 202 with a host computer. This command can have an associated parameter that indicates the type of database synchronization information requested. One type of information can be a database identifier ("DBID") that is fixed for a particular combination of PMD 202 and host computer database to which that PMD 202 synchronizes. Another type of information can be a synchronization index ("SyncID") that changes every time PMD 202 synchronizes with its host computer and otherwise remains constant. Other types of information can include, e.g., the date and time of the last synchronization between PMD 202 and its host computer as well as counts of various types of media assets stored on PMD 202.

(2) A RetDBSyncInfo command, sent by PMD 202 in response to the GetDBSyncInfo command. This command is used to return the requested database synchronization information.

When PMD 202 becomes connected, accessory 220 can use these commands to obtain database synchronization information from PMD 202. Comparing the newly obtained database synchronization information to cached database synchronization information obtained before PMD 202 last disconnected can indicate whether a synchronization operation occurred since the last time PMD 202 was connected and consequently whether the database of PMD 202 may have been updated. If no synchronization operation (or other database update) has occurred, then accessory 220 can treat any previously cached data as valid. If a synchronization operation has occurred, then accessory 220 can treat previously cached data as invalid.

Figure 3:
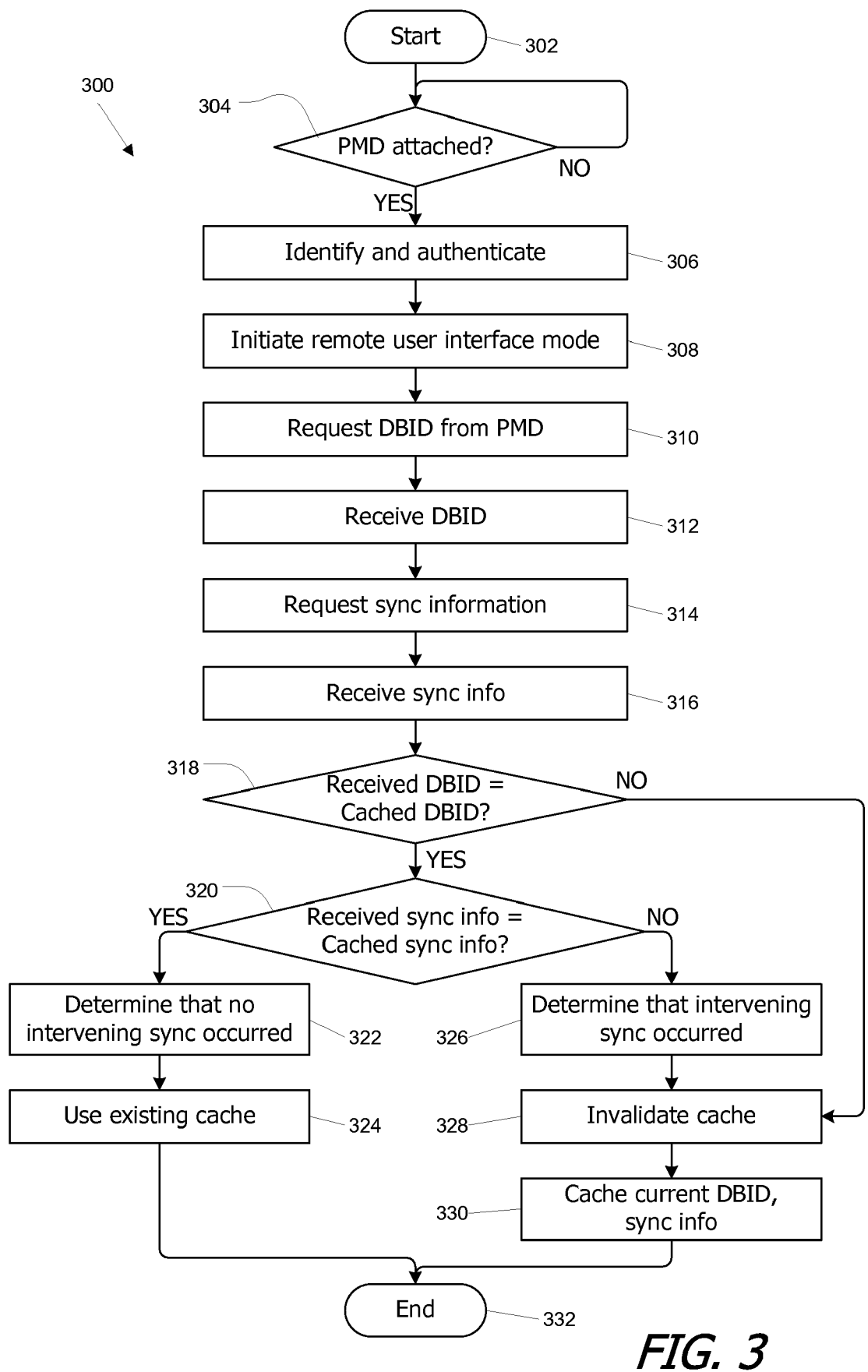
FIG. 3 is a flow diagram of a process that can be used by an accessory when a PMD becomes connected to determine whether to use an existing cache of PMD information according to an embodiment of the present invention.

FIG. 3 is a flow diagram of process 300 that can be used by accessory 220 when PMD 202 connects to determine whether to use existing data in cache 228 according to an embodiment of the present invention. Process 300 starts (step 302) when PMD 202 is not connected to accessory 220. At step 304, accessory 220 attempts to detect that PMD 202 has been connected. Detecting connection may include, e.g., detecting an electrical contact made via a connector or detecting a wireless signal indicating that PMD 202 is ready to communicate with accessory 220. Process 300 can wait at step 304 until such time as connection of PMD 202 is detected.

At step 306, once PMD 202 is connected, accessory 220 can identify itself to PMD 202. Identification may include, e.g., sending a command to PMD 202 indicating that accessory 220 supports the remote user interface lingo. Step 306 may also include performing an authentication procedure, e.g., using digital signatures, to confirm that accessory 220 is authorized to invoke the remote user interface functionality of PMD 202. Step 306 can also include PMD 202 identifying and/or authenticating itself to accessory 220.

At step 308, accessory 220 can initiate the remote user interface operating mode of PMD 202. In this mode, PMD 202 can disable its own user interface and operate in response to commands received from accessory 220. In one embodiment, accessory 220 may send an EnterRemoteUIMode command to PMD 202 to initiate the remote user interface mode. In other embodiments, PMD 202 may automatically enter the remote user interface mode based on the identification of accessory 220 at step 306.

At step 310, accessory 220 can request database identifying information from PMD 220, e.g., by sending a GetDBSyncInfo command with the parameter set to request the DBID. At step 312, accessory 220 can receive the DBID (or other requested database identifying information) from PMD 220; for instance, PMD 220 may send a RetDBSyncInfo command whose payload includes the DBID.

At step 314, accessory 220 can request database synchronization information from PMD 220, e.g., by sending a GetDBSyncInfo command with the parameter set to request the SyncID or by sending a GetDBSyncInfo command with the parameter set to request synchronization data and/or time information. At step 316, accessory 220 can receive the requested database synchronization information from PMD 220; for instance, PMD 220 may send a RetDBSyncInfo command whose payload includes the requested database synchronization information.

At step 318, accessory 220 can compare the received database identifying information to cached database identifying information stored in cache 228 (e.g., from a previous execution of process 300). If the cached information does not match the received information, then the cache can be invalidated as described below.

If, at step 318 the cached database ID and the received database ID are the same, accessory 220 can compare the received synchronization information to cached synchronization information stored in cache 228 (e.g., from a previous execution of process 300). If the cached synchronization information matches the received synchronization information, then accessory 220 determines (step 322) that PMD 202 did not synchronize with a host computer while it was disconnected from accessory 220. Therefore, at step 324, accessory 220 can continue to use any existing cached information regarding the content of PMD 202 that may be present in cache 228.

If, at step 320, the cached synchronization does not match the received synchronization information, accessory 220 can determine (step 326) that PMD 202 synchronized with a host computer while it was disconnected from accessory 220. At step 328, accessory 220 can invalidate the contents of cache 228, and at step 330, accessory 220 can cache the current database ID and synchronization information. In another embodiment, accessory 220 can update the information stored in cache 228, e.g., using commands described below to request updated metadata for each track for which metadata is present in cache 228. Thereafter process 300 ends (step 332), although accessory 220 and PMD 202 can remain connected and can continue to operate in the remote user interface mode. For example, accessory 220 can initialize its display to present a remote user interface menu to the user and wait for user input. While accessory 220 and PMD 202 remain connected, accessory 220 can cache various information received from PMD 202, such as metadata for a particular track (e.g., track type, track name, artist, album, genre, etc.).

It will be appreciated that process 300 is illustrative and that variations and modifications are possible. Steps described as sequential may be executed in parallel, order of steps may be varied, and steps may be modified or combined. If the media assets and metadata stored on PMD 202 change only during synchronization with a host computer, then any time PMD 202 re-connects to accessory 220, accessory 220 can use process 300 or other processes using the commands described above to determine whether the database of PMD 202 was updated while PMD 202 was disconnected from accessory 220. Consequently, accessory 220 can cache information obtained from PMD 202 and can continue to use cached information across multiple connection/disconnection cycles, for at least as long as a database synchronization operation between PMD 202 and a host computer does not occur. This can reduce the burden on the communication path between accessory 220 and PMD 202 by reducing redundant requests for information. Further, accessory 220 in some embodiments can maintain cached information for multiple PMDs. For example, the cache can be physically or logically partitioned with each partition being associated with a different DBID. In this case, when a PMD connects, accessory 220 can compare the DBID to the DBID associated with each partition to determine which partition of the cache pertains to the currently connected PMD. Thereafter, accessory 220 can use the synchronization information to determine whether cached information in the pertinent partition should be invalidated.

In some embodiments PMD 202 may be able to update its database without synchronizing with a host computer. For example, PMD 202 may provide a wired or wireless Internet connection and may be able to download assets via the Internet without intervention by a host computer. In such embodiments, if PMD 202 updates its synchronization information whenever the database content changes, process 300 can still be used by accessory 220 to determine whether cached information is reliable.

In still other embodiments, PMD 202 may provide a database identifier that changes whenever PMD 202 synchronizes with a host computer. Accessory 220 can then detect an intervening synchronization operation from the database identifier without requesting additional synchronization information.

Obtaining Media Asset Metadata

While in remote user interface mode, accessory 220 may obtain metadata about media assets that are stored on PMD 202 including not only the currently playing track but also other tracks as well. For example, in one embodiment, playback engine 210 of PMD 202 may already have one or more tracks queued for playback at the time when PMD 202 becomes connected to accessory 220. Queued tracks can include, e.g., one of the playlists stored in the database of PMD 202, a user selection of one or more related database entries (e.g., all tracks of an album or all tracks by a particular artist), or a list of tracks selected by the user via user interface 208 of PMD 202. In one embodiment, the following commands can be used to obtain information about tracks queued in playback engine 210:

(1) A GetPBTrackInfo command that can be sent by accessory 220 to PMD 202 to request information for one or more tracks queued in playback engine 210. The command parameters can include a starting track index, a track count, and a bitmask identifying the type(s) of information requested. Playback engine 210 of PMD 202 can maintain an indexed list of tracks in the playback queue, with the index corresponding to the order in which tracks are to be played. The starting track index of the GetPBTrackInfo command can identify the playback engine index for the first track of interest, and the track count can identify a range of tracks starting from the starting track index for which information is requested. In one embodiment, the track count can be set to a special value (e.g., −1) to indicate that PMD 202 should return information for all tracks in the queue, starting with the starting track identifier. Type(s) of information can include information about the track itself such as, e.g., media type (audio, video, etc.); genre information; whether the track has associated data (e.g., artwork or images, song lyrics, etc.); track identifier (e.g., as assigned by a media asset management application); track name; artist name; composer name; album name; series name and season identifier (e.g., for television shows); track duration; chapter information (for tracks that have chapters); release date of the track; etc. Other information types can relate to the user's interaction with the track, e.g., a count of the number of times the track has been played or skipped; date and time when the track was most recently played; the user's rating of the track; etc. In some embodiments, any type of information that may be stored in PMD 202 can be requested.

(2) A RetPBTrackInfo command that can be sent by PMD 202 to accessory 220 to return the requested track information. In one embodiment, accessory 220 can request information for multiple tracks with a single GetPBTrackInfo command, and PMD 202 can send a separate RetPBTrackInfo command for each track for which information was requested and for each type of information. Thus, the RetPBTrackInfo command can include a track identifier and information type identifier as parameters. PMD 202 can respond to a single GetPBTrackInfo command by sending a series of RetPBTrackInfo commands to accessory 220 in rapid succession without waiting for a response. Accessory 220 can buffer the received RetPBTrackInfo commands and process them sequentially. In some embodiments, the size of a buffer in accessory 220 may limit the number of tracks for which accessory 220 can request information using a single GetPBTrackInfo command and/or the number of information types included in a single GetPBTrackInfo command.

In other embodiments, accessory 220 can also obtain information for tracks not in the playlist of playback engine 210. For example, a GetDBTrackInfo command and a RetDBTrackInfo command can be similar to the GetPBTrackInfo command and RetPBTrackInfo command described above, except that the track index refers to a database index based on a listing of tracks currently selected by database engine 212 rather than to an index in the playback queue. In another embodiment, a GetUIDTrackInfo command and a RetUIDTrackInfo command can be similar to the GetPBTrackInfo command and RetPBTrackInfo command described above, except that instead of a track index and track count, a unique track identifier ("UID") is used as the input parameter. The UID is advantageously different for every track stored on PMD 202.

Creating and Modifying Playlists via Remote User Interface

In another embodiment of the present invention, the remote user interface protocol can include commands that allow a user to create, modify, and delete a playlist (e.g., in playback engine 210) by interacting with user interface 222 of accessory 220. In some embodiments, these commands can support multiple such playlists concurrently. For example, the following commands can be used:

(1) A PlaylistCreate command that can be sent by accessory 220 to PMD 202 to indicate that a new playlist (referred to herein as a "remote playlist") is to be created. This command need not include any parameters or other data.

(2) A PlaylistAck command that can be sent by PMD 202 to acknowledge playlist-related commands received from accessory 220. In one embodiment, the PlaylistAck command includes a "playlist ID" parameter identifying the remote playlist to which the command pertains, an identifier of which playlist-related command is being acknowledged, and a status data indicating whether any errors occurred. In one embodiment, the PlaylistAck command returned in response to a PlaylistCreate command establishes the playlist identifier that is thereafter used by accessory 220 and PMD 202 to refer to the remote playlist that PMD 202 creates. The playlist ID parameter can be used to support coexistence of multiple remote playlists.

(3) A PlaylistAddTrack command that can be sent by accessory 220 to PMD 202 to indicate that a track should be added to the remote playlist. The track can be identified, e.g., using the UID described above. The command can also include the playlist ID parameter. In one embodiment, tracks are added to the end of the remote playlist identified by playlist ID.

(5) A PlaylistAddDBSelection command that can be sent by accessory 220 to PMD 202 to indicate that the track(s) currently selected by database engine 212 should be added to the remote playlist. The command can also include the playlist ID parameter. In one embodiment tracks are added to the end of the remote playlist identified by playlist ID. The addition of currently selected tracks to the remote playlist can be independent of how the selection was made. For example, in some embodiments a user can select all tracks on an album, all tracks by an artist, all tracks in a genre, etc.; once such a selection is made, the PlaylistAddDBSelection command can be used to add the selected tracks to the remote playlist.

(6) A PlaylistRem Track command that can be sent by accessory 220 to PMD 202 to indicate that a track should be removed from the remote playlist. The track can be identified, e.g., using the UID described above. The command can include the playlist identifier as a parameter. In some embodiments, multiple tracks can be removed using a single PlaylistRem Track command.

(7) A PlaylistSortOrder command that can be sent by accessory 220 to PMD 202 to reorder tracks in the remote playlist. Tracks can be sorted based on any available information, including genre, artist, composer, album, track, release date, series, season, episode, presence in a playlist, expiration date (e.g., in embodiments where some or all tracks may be available on PMD 220 for a limited time), and so on. The command can include the playlist ID parameter and/or a parameter identifying the information type to be used for sorting.

(8) A PlaylistDelete command that can be sent by accessory 220 to PMD 202 to indicate that the remote playlist should be deleted. (Deleting a playlist does not delete tracks from storage device 206 of PMD 202.) The command can include the playlist identifier as a parameter.

Figure 4A:
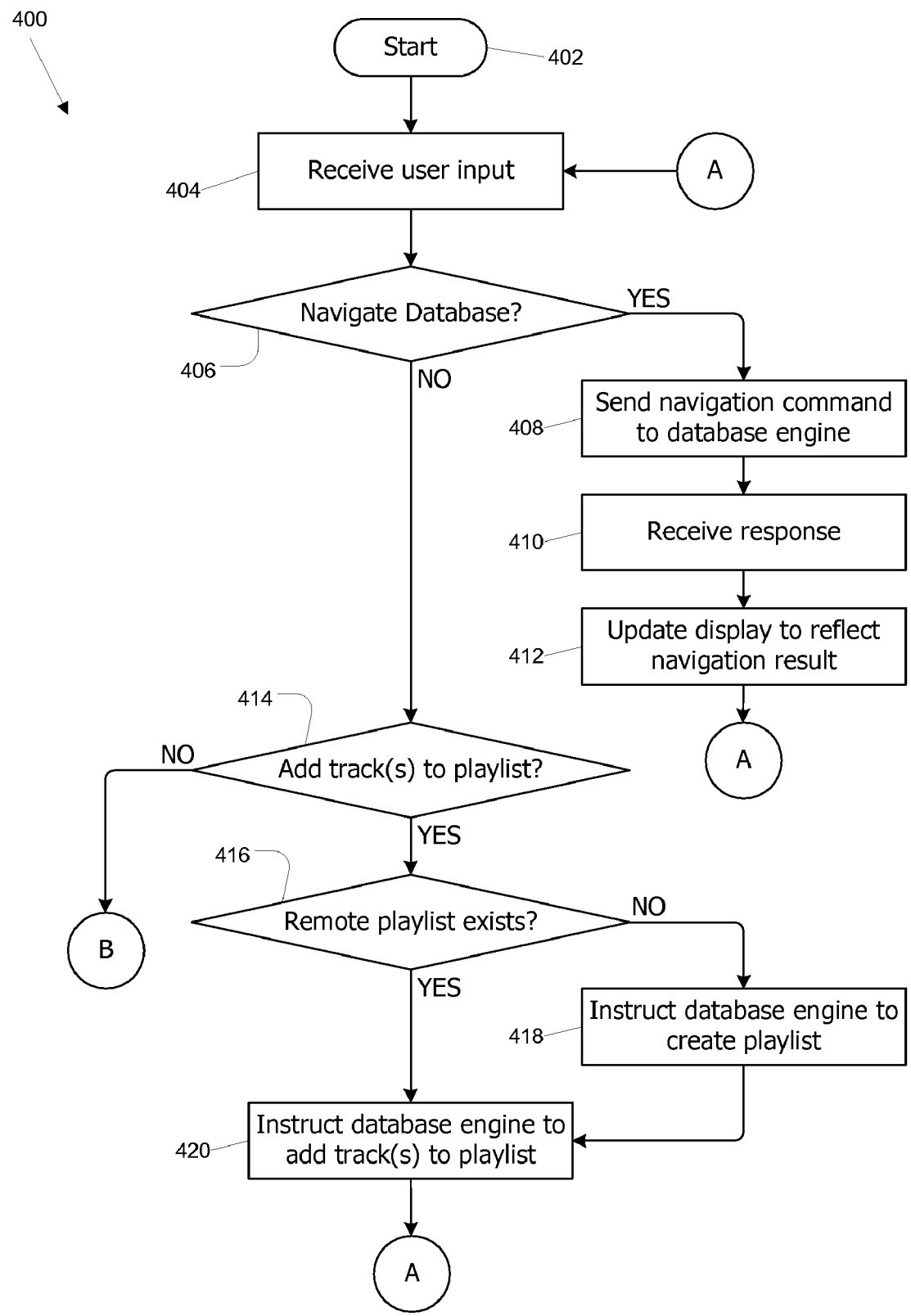
FIGS. 4A and 4B are a flow diagram of process that can be used by an accessory to build and manage a remote playlist for a PMD according to an embodiment of the present invention.
Figure 4B:
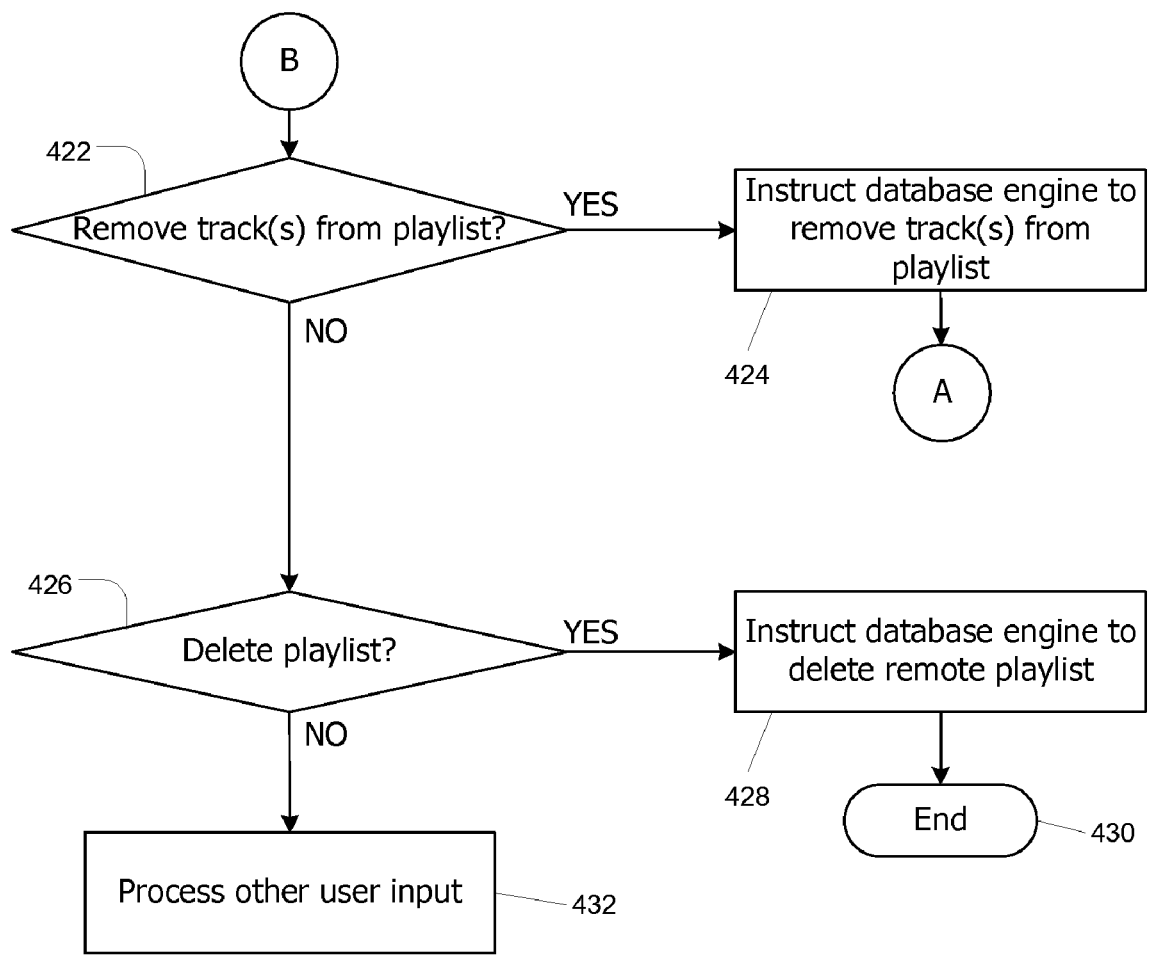

FIGS. 4A and 4B are a flow diagram of process 400 that can be used by accessory 220 to build and manage a remote playlist according to an embodiment of the present invention. Referring first to FIG. 4A, process 400 starts (step 402) when accessory 220 is connected to PMD 202; for example, process 300 of FIG. 3 may already have been executed. At step 404, accessory 220 can receive a user input; process 400 can remain at step 404 until such time as a user input is received. The action to be taken depends on the user input.

At step 406, it is determined whether the user input pertains to database navigation. In one embodiment, database navigation can be accomplished by accessory 220 presenting a menu of navigational options to a user; the options may mimic some or all of the options that would be presented on the user interface of PMD 220. For instance, the user may initially select a media type, then select within that media type by genre, album, artist, etc. If the user input pertains to database navigation, then at step 408, accessory 220 can send a database navigation command to database engine 212 of PMD 202 (e.g., indicating the user's selection). At step 410, accessory 220 can receive a response to the database navigation command (e.g., providing a new list of selection options), and at step 412, accessory 220 can update its display to reflect the result of the navigation command (e.g., displaying the new options). Conventional commands for a remote user interface can be used to implement database navigation at steps 408 and 410. Thereafter, process 400 can return (node A) to step 404 to await the next user input.

Thus, it is to be understood that database navigation can be an iterative process. At each stage of navigation, as the user makes a selection, accessory 220 can send a navigational command to PMD 220 reporting the selection made and can receive a response indicating what content or further selections are available. For example, if the user selects a "music" or "video" media asset type, accessory 220 can send a command indicating that selection to PMD 202; PMD 202 can respond with a list of categories within the selected media asset type. Suitable commands for database navigation are known in the art (see, e.g., U.S. Pat. No. 7,293,122 for examples; other examples are implemented in iPod® media players).

If the user input does not pertain to database navigation, then at step 414, it is determined whether the user input pertains to adding one or more tracks to the remote playlist. For example, the user may select a single track from a list of tracks to be added to the playlist, or the user may select all tracks in a currently displayed list (e.g., all tracks of a currently selected album, all tracks by a currently selected artist, etc.). If the user input pertains to adding tracks, then at step 416, a further determination can be made as to whether a remote playlist already exists. If a remote playlist does not already exist, accessory 220 can instruct database engine 212 of PMD 202 to create the remote playlist (step 418), e.g., using the PlaylistCreate command described above. Accessory 220 can wait for a PlaylistAck command before proceeding to step 420 to instruct database engine 212 to add the selected track(s) to the remote playlist. For example, a single track can be added using the PlaylistAddTrack command described above; a selected list of tracks can be added using the PlaylistAddDBSelection command described above.

If, at step 416, the remote playlist already exists, then accessory 220 can proceed directly to step 420 to add the track(s) to the remote playlist. Once the tracks have been added, process 400 can return (node A) to step 404 to await the next user input.

If the user input does not pertain to database navigation or adding tracks to the remote playlist, then process 400 continues (node B) as shown in FIG. 4B. At step 422, process 400 can determine whether the user input pertains to removing one or more tracks from the remote playlist. If so, then at step 424, accessory 220 can instruct database engine 212 to remove the track(s), e.g., using the PlaylistRem Track command described above. Thereafter, process 400 can return (node A) to step 404 to await the next user input.

If the user input does not pertain to database navigation, adding tracks, or removing tracks, at step 426, process 400 determines whether the user input pertains to deleting the remote playlist. If so, then at step 428, accessory 220 can instruct database engine 212 to delete the remote playlist, e.g., using the PlaylistDelete command described above. Once the remote playlist is deleted, process 400 can end (step 430) or return to step 404 to await further user input.

At step 432, other user input can be processed. Such user input may pertain to, e.g., reordering the tracks of the remote playlist using the PlaylistSortOrder command; starting, pausing, or resuming playback of the remote playlist; advancing to the next track; returning to the previous track; beginning or ending fast forward or rewind operations; displaying information about the currently playing track; adjusting volume or equalizer settings, etc. In some instances, the user input may cause process 400 to end; in other instances, after processing the user input at step 432, process 400 can return to step 404 to await further user input.

It will be appreciated that process 400 is illustrative and that variations and modifications are possible. Steps described as sequential may be executed in parallel, order of steps may be varied, and steps may be modified or combined. Using process 400 or other processes invoking the commands described above, a user can operate the remote user interface provided by accessory 220 to select a single track or group of tracks and instruct accessory 220 to add the selected track(s) to the remote playlist. The user can also remove tracks from the playlist, reorder tracks on the playlist, and control playback, all via accessory 220.

A remote playlist can include any number of tracks. In some embodiments, an upper limit may be imposed on the number of tracks that can be included in a single remote playlist. If an attempt to add tracks (e.g., using the PlaylistAddTrack or PlaylistAddDBSelection commands described above) would result in the remote playlist exceeding the maximum number of tracks, PMD 202 can send a PlaylistAck command with status data indicating that the tracks were not added because of the limit on the number of tracks. Accessory 220 can then notify the user of the failure, e.g., by displaying a message. In other embodiments, accessory 220 may be programmed to keep a running count of the number of tracks in a remote playlist and to refuse a user request for adding additional tracks if the upper limit is exceeded; again, accessory 220 can communicate a failure message to the user. The upper limit in this instance may be established by accessory 220 or PMD 202. For example, in the former case, a developer of accessory 220 can program or hard-wire a limit into a register. In the latter case, accessory 220 and PMD 202 may exchange additional commands related to remote playlist capability, and such commands can include a command by which PMD 202 specifies the maximum number of tracks. Thus, an upper limit on number of tracks per remote playlist can be established and/or enforced by either PMD 202 or accessory 220.

Similarly, any number of remote playlists can be concurrently defined, provided that a unique playlist ID exists for each concurrently defined remote playlist. As with the number of tracks per remote playlist, the maximum number of remote playlists can be established and/or enforced by either PMD 202 or accessory 220. In one embodiment, if the maximum number of remote playlists already exists, PMD 202 can respond to a further PlaylistCreate command from accessory 220 by sending a PlaylistAck command with status data indicating that the playlist was not created because the maximum number of playlists already exists. Accessory 220 can then notify the user, e.g., by displaying a message. In other embodiments, accessory 220 may be programmed to keep a running count of the number of remote playlists and to refuse a user request for creating an additional remote playlist if the upper limit has been reached; again, accessory 220 can communicate this condition to the user. The upper limit on number of remote playlists may be established by accessory 220 or PMD 202. For example, in the former case, a developer of accessory 220 can program or hard-wire a limit into a register. In the latter case, accessory 220 and PMD 202 may exchange additional commands related to remote playlist capability, and such commands can include a command by which PMD 202 specifies the maximum number of remote playlists supported. Thus, an upper limit on the number of remote playlists can be established and/or enforced by either PMD 202 or accessory 220.

In some embodiments where multiple remote playlists can coexist within PMD 202, the playback ID can be included as a command parameter in the above commands to identify one of the multiple remote playlists as being subject to the command. Accessory 220 can provide user control over the multiple playlists. For example, accessory 220 may implement a user interface element (e.g., a menu item in a graphical user interface) that allows a user to request creation of a new remote playlist. In response to such a request, accessory 220 can send a PlaylistCreate command to PMD 202 and obtain (via the PlaylistAck command) a playlist ID for the new remote playlist. For manipulation of existing remote playlists, one embodiment of accessory 220 provides a menu of existing remote playlists; the user can select an existing remote playlist as a "current" playlist to which subsequent playlist-related commands are to be applied until such time as the user changes that selection. When a user input results in transmitting a playlist-related command (e.g., any of the commands described above) to PMD 202, accessory 220 can provide the playlist ID of the current playlist as a parameter of the command. Thus, for example, a newly created remote playlist can automatically be designated as the current playlist upon creation, but the user can interact with the user interface of accessory 220 to select a different remote playlist as current at a subsequent time.

After one or more remote playlists have been created, in some embodiments a user can operate accessory 220 to view a list of remote playlists, as well as a list of tracks in a remote playlist. In one such embodiment, a list of remote playlists can appear in a listing of all playlists; this list may include, e.g., "static" playlists stored on PMD 202 that were defined via a media asset management program executing on a host computer as described above, or other playlists created using conventional techniques. The remote playlists can have default names such as "Remote Playlist 1," "Remote Playlist 2," etc. and can be grouped at the end of the list or presented elsewhere within the list. In another embodiment, the listing of remote playlists is viewed separately from the listing of other playlists.

Accessory 220 can, but is not required to, maintain a local store of information about the remote playlists it creates. In some embodiments, accessory 220 retrieves playlist-related information on demand from PMD 202. In one embodiment, PMD 202 and accessory 220 support additional commands that allow accessory 220 to retrieve a listing of static playlists and/or information about tracks included in the static playlist. These commands can be used to retrieve listings and information for remote playlists. Alternatively, separate commands specific to remote playlists can be provided. The former option reduces the number of commands used to create and manage playlists, while the latter separates the static playlists from the remote playlists, which can be dynamically updated, thus potentially simplifying information management.

In one embodiment, the remote playlist can persist until it is deleted by the user or until PMD 202 disconnects from accessory 220. In another embodiment, accessory 220 can cache information identifying the tracks included in the remote playlist (e.g., in cache 228) and can restore the remote playlist automatically when PMD 202 reconnects. The cached information might include, e.g., the unique identifier (UID) of the track, database index, and/or other identifying information such as title, artist, album, etc. In some embodiments, the cached remote playlist information can be invalidated if PMD 202 was synchronized with a host computer (or its database was otherwise updated) between disconnecting from accessory 220 and reconnecting to accessory 220. In still other embodiments, if an intervening synchronization is detected, accessory 220 can use the GetUIDTrackInfo command described above (or another command) to determine whether each track in the remote playlist is still present in PMD 202 and can automatically update the remote playlist by removing from the playlist any tracks that have been deleted from PMD 202. Techniques described above can be used by accessory 220 to detect intervening synchronization of PMD 202 with a host computer or other intervening database updates.

In yet another embodiment, PMD 202 can be configured to store the remote playlist indefinitely. For example, the remote playlist can be stored until PMD 202 synchronizes with a host computer. Via the media asset management application of the host computer, a user can elect to add the remote playlist to playlists 211 (and assign it a persistent name) or delete the remote playlist.

As noted above, in some embodiments a user can create a temporary playlist by interacting directly with user interface 208 of PMD 202. Thus, when PMD 202 connects to accessory 220, playback engine 210 may already have a temporary playlist or other playlist queued for playback. In some embodiments of the present invention, accessory 220 can detect whether a temporary playlist or other playlist is already queued in playback engine 210 and can retrieve information about the queued playlist. Accessory 220 can use this information to initialize a remote playlist, which the user can then further manipulate via accessory 220, e.g., using process 400.

Figure 5:
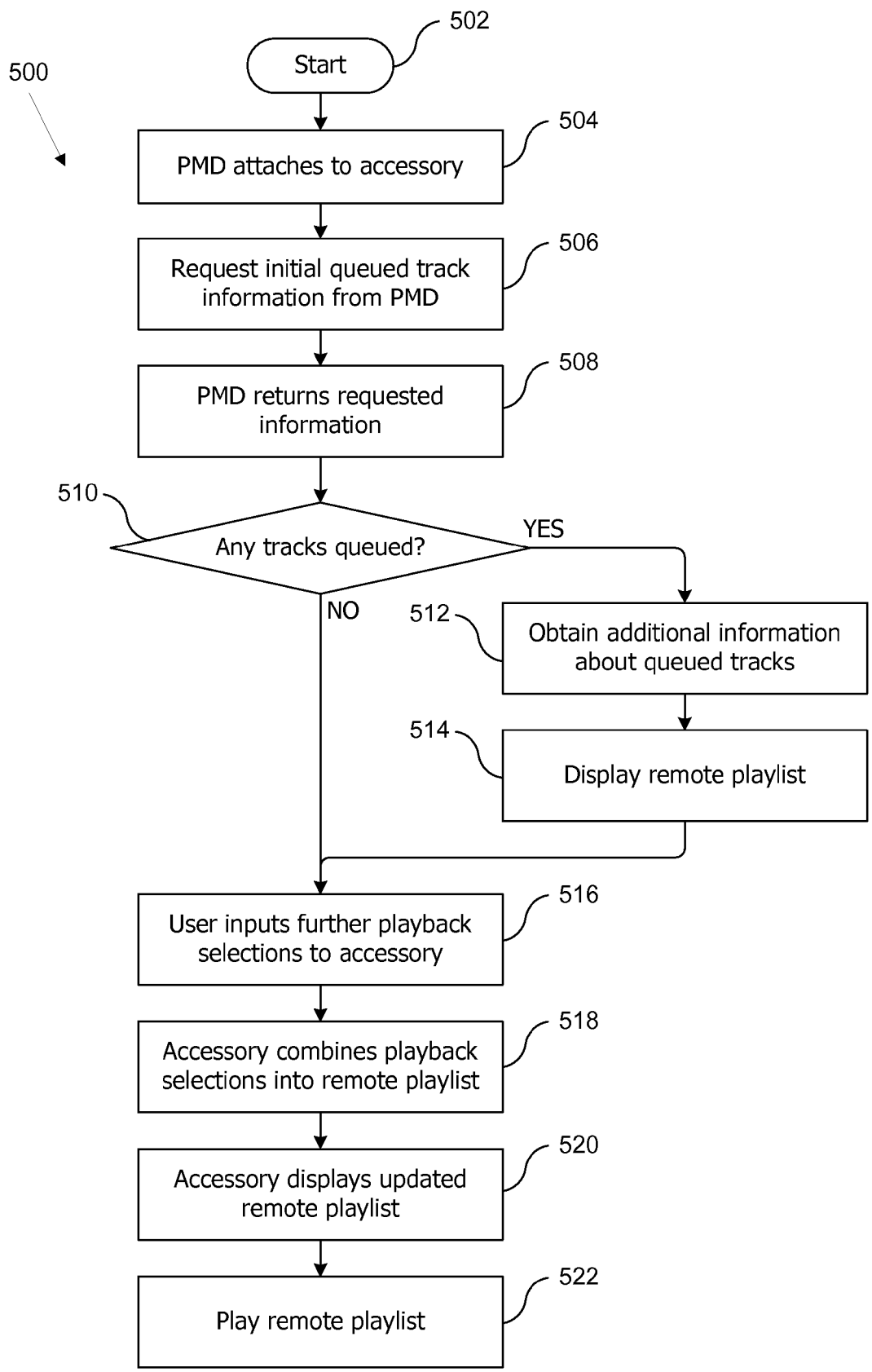
FIG. 5 is a flow diagram of a process that can be used by an accessory to detect and interact with a temporary playlist already existing in a PMD according to an embodiment of the present invention.

FIG. 5 is a flow diagram of a process 500 that can be used by accessory 220 to detect and interact with a temporary playlist already existing in playback engine 210 according to an embodiment of the present invention. Process 500 starts (step 502) when PMD 202 connects to accessory 220 at step 504. In some embodiments, step 504 can include performing all or part of process 300 of FIG. 3.

At step 506, accessory 220 can request playback track information from PMD 202, e.g., using the GetPBTrackInfo command described above, with the starting track index set to 0 (the first track in the playlist) and the track count set to a special value (e.g., −1) that designates that information is requested for all playing tracks. The information type parameter can be set to request a small amount of information for each track, to allow accessory 220 to determine how many tracks are in the currently queued playlist. At step 508, PMD 202 returns the requested information, e.g., using one or more RetPBTrackInfo commands as described above. If no tracks are currently queued, PMD 202 may return an error message or other command signifying that playback engine 210 has no tracks queued for playback.

At step 510, accessory 220 determines whether any tracks are currently queued in playback engine 210; the determination can be based on the response from PMD 202 received at step 508. If any tracks are queued, at step 512 accessory 220 can obtain additional information about the queued tracks, e.g., by sending one or more additional GetPBTrackInfo commands to PMD 202 and receiving one or more RetPBTrackInfo commands in response. At step 514, accessory 220 can display the remote playlist, which at this point can be identical to the playlist that was queued in playback engine 210 prior to PMD 202 connecting to accessory 220.

At step 516, the user can input further playback selections to accessory 220, and at step 518, accessory 220 combines these further playback selections into the remote playlist. For example, process 400 of FIG. 4 can be used to update the remote playlist. Accessory 220 can display the updated remote playlist (step 520), incorporating the previously queued playlist as well as any user modifications, and/or begin playing the remote playlist (step 522). Displaying and playing of the remote playlist may be responsive to user inputs to accessory 220.

It will be appreciated that process 500 is also illustrative and that variations and modifications are possible. Steps described as sequential may be executed in parallel, order of steps may be varied, and steps may be modified or combined. As noted above, a remote playlist can persist in accessory 220, e.g., until PMD 202 is disconnected or until a new synchronization operation between PMD 202 and its host computer occurs. In addition, in some embodiments, PMD 202 can obtain the remote playlist from accessory 220 and store the playlist, e.g., in storage device 206. The remote playlist can thereafter be accessible directly from PMD 202, and PMD 202 can provide the remote playlist to a host computer during a subsequent synchronization operation, either automatically or based on a user request.

Using the commands described above, accessory 220 can be used to manage a remote playlist for PMD 202. The remote playlist can be created, modified, and deleted on the fly by the user interacting with the remote user interface provided by accessory 220. Accessory 220 can signal user selections from the database of PMD 202 (e.g., a single media asset or a group of media assets) to PMD 202 and can instruct PMD 202 to add the selections to the remote playlist. Accessory 220 can create the remote playlist starting from an empty list or from a list of media assets that were queued for playback at the time when PMD 202 connected to accessory 220, thus providing continuity of playback engine state when PMD 202 connects to accessory 220. Other commands can also be used in addition to or instead of those specifically described herein.

Continuity of Database Engine State

Another embodiment provides commands via which accessory 220 can determine a database navigation path that was followed by the user prior to connecting PMD 202 to accessory 220. Thus, upon connection, accessory 220 can reproduce not only the current database selection of database engine 212 but also the navigation history of how the current database selection came to be made. For example, the following commands can be used:

(1) A GetDBStateForPB command that can be sent by accessory 220 to PMD 202. In some embodiments, the accessory can specify one or more types of database information that should be provided. For example, the GetDBStateForPB command can have, as a parameter, a bitmask with a set of bits corresponding to one or more database information types; each bit can be set or cleared to indicate whether the corresponding information type should or should not be returned. Any type of selection a user might make can be associated with a bit in the bitmask. Examples of selections include playlist, artist, album, genre, etc. In addition, information types can also pertain to a selection (or navigation) path that was followed by a user. For example, bits in the information type bitmask can be used to request information as to whether an audio or video hierarchy within the database was selected and/or what, if any, selections were made at various levels within the hierarchy (e.g., a selection of playlists, genres, albums, artists, composers, audiobooks, specific tracks, and so on). Still other information types can pertain to PMD 202 settings, such as the current shuffle setting (whether tracks will be queued for playback in the listed order or a random reordering thereof) and repeat setting (whether the content of the playback queue, or a subset thereof, will be repeated or played one time).

(2) A RetDBStateForPB command that can be sent by PMD 202 to accessory 220 in response to the GetDBStateForPB command. The payload of the RetDBStateForPB command can include the information types specified in the GetDBStateForPB command, and in some embodiments, a separate RetDBStateForPB command can be used to return each type of information requested. In some embodiment, the payload of the RetDBStateForPB command can include navigation history information that identifies a navigational path through the database that was followed by the user of PMD 202. For example, if the user of PMD 202 had chosen to display music tracks, then a list of artists, then a list of albums by a selected artist, then a list of songs on a selected album, thus arriving at a currently selected song, the payload of the RetDBStateForPB command can include data indicating each step of this selection path. Alternatively, if the user of PMD 202 had chosen to display music tracks, then a list of genres, then a list of albums in a selected genre, then a list of songs in the selected album, thus arriving at a currently selected song, the payload of the RetDBStateForPB command can include data indicating each step of this alternative selection path. If no database navigation was in progress, the payload of the RetDBStateForPB command may indicate a null path.

In one such embodiment, where the GetDBStateForPB command requested selection path information, the payload of each RetDBStateForPB command can include a database index value for a selection made during navigation of a database hierarchy. The information can be formatted using one byte (referred to herein as a "level byte") to identify a level within the hierarchy and one or more additional bytes (referred to herein as "index byte(s)") to a selection made at that level. A special value (e.g., −1) can be used to indicate that no selection was made at a given level.

For example, suppose that the user of PMD 202 had arrived at a currently playing song by first selecting music tracks, then selecting an artist from a list of artists, then selecting an album by the selected artist, then selecting a song from the album. In one embodiment, this information can be represented using multiple RetDBStateForPB commands, one for each selection. A first RetDBStateForPB command can include a level byte indicating "hierarchy type" and an index byte (or bytes) with a value corresponding to "music." A second RetDBStateForPB command can include a level byte indicating "artist" and an index byte with a value corresponding to the selected artist. (In one embodiment, artists represented in the database are assigned sequential index values in alphabetical order, and the index byte is the index assigned to the selected artist.) A third RetDBStateForPB command can include a level byte indicating "album" and an index byte with a value corresponding to the selected album. (As with artists, albums by an artist can be assigned sequential index values in alphabetical order.) A fourth RetDBStateForPB command can include a level byte indicating "song" and an index byte with a value corresponding to the selected song. (Again, songs in an album can be assigned sequential index values, e.g., corresponding to order of album tracks.) Additional RetDBStateForPB commands can also be used; e.g., a command with a level byte indicating "genre" can have an index byte indicating no selection made at that level. (Although the foregoing refers to "index byte" in the singular, it is to be understood that multiple bytes can be used to represent the index value if appropriate.)

In this embodiment, the order in which the RetDBStateForPB commands are returned need not match the order in which selections were made. Navigation history can be reconstructed by accessory 220 based on rules of the database hierarchy implemented in PMD 202. For example, the various selection categories such as genre, artist, album, etc. may each be given a hierarchical rank, and the selections proceed in rank order. Thus, for example, if artist has a higher rank than album, if the RetDBStateForPB command indicates that both an artist selection and an album selection were made, it follows from the rankings that the artist selection would have been made first.

PMD 202 can respond to a single GetDBStateForPB command by sending a series of RetDBStateForPB commands to accessory 220 in rapid succession without waiting for a response. Accessory 220 can buffer the received RetDBStateForPB commands and process them sequentially. In some embodiments, the size of a buffer in accessory 220 may limit the number of tracks for which accessory 220 can request information using a single GetDBStateForPB command and/or the number of information types included in a single GetDBStateForPB command.

The accessory can use the navigation history information in various ways. For example, if the user had selected an album before connecting PMD 202 to accessory 220, the remote user interface provided by accessory 220 can initially display the list of tracks on the selected album. In addition, user interface 222 of accessory 220 can implement a "back" control, allowing a user to back up on a navigational path. Based on the navigational history provided by PMD 202, accessory 220 can correctly navigate backward along a selection path even if the path was initially navigated before PMD 202 connected to accessory 220.

Figure 6:
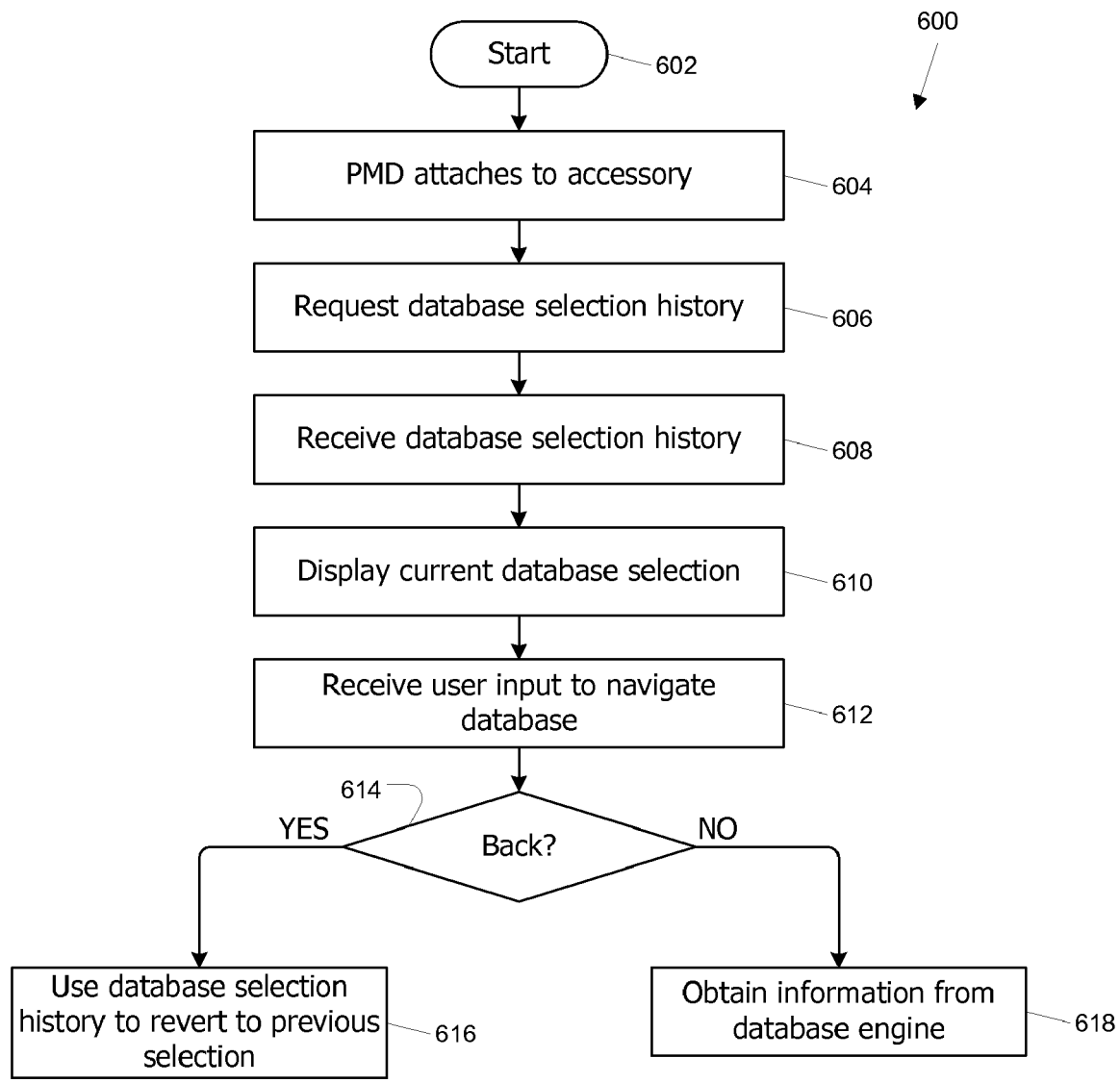
FIG. 6 is a flow diagram of process that can be used by an accessory to recreate a pre-existing database navigation path of a PMD according to an embodiment of the present invention.

FIG. 6 is a flow diagram of process 600 that can be used by accessory 220 to recreate a pre-existing database navigation path according to an embodiment of the present invention. Process 600 starts (step 602) when PMD 202 connects to accessory 204 at step 604. In some embodiments, step 604 can include performing all or part of process 300 of FIG. 3 and/or all or part of process 500 of FIG. 5 (if it is desired to establish the current playback engine state).

At step 606, accessory 220 requests the database selection history from PMD 202, e.g., by using a GetDBStateForPB command as described above. At step 608, PMD 202 returns the history information, e.g., using a RetDBStateForPB command as described above.

At step 610, accessory 220 can display the current database selection for the user, allowing the user to begin or continue navigation. At step 612, accessory 220 can receive a user input pertaining to navigation of the database. At step 614, accessory 220 determines whether the user input is a "back" command, signifying that the user wants to back up along the navigational path. If so, then at step 616, accessory 220 can use the database selection history information received at step 608 to revert to a previous point on the selection path. Otherwise, at step 618, accessory 220 can continue the navigation from the current selection, e.g., by obtaining information from database engine 210 using other remote interface commands.

It will be appreciated that process 600 is illustrative and that variations and modifications are possible. Steps described as sequential may be executed in parallel, order of steps may be varied, and steps may be modified or combined.

In one embodiment, process 600 can be used if PMD 202 connects to accessory 220 at a time when one or more media assets are queued for playback in playback engine 210 of PMD 202. Using process 600 or other processes with the commands described above, accessory 220 can obtain information about the navigational path that the user followed to select the queued media asset(s) via user interface 208 of PMD 202. Accessory 220 can then initialize its remote user interface presentation based on this navigational path. The result can be a more seamless transition for the user from controlling PMD 202 via user interface 208 to controlling PMD 202 via user interface 222 of accessory 220.

Alphabetical Database Lookup

Still another embodiment of the present invention relates to improved database lookup. For example, accessory 220 can support an alphabetical lookup of tracks stored on PMD 202 using the following commands:

(1) A GetDBIndexByAlpha command sent by accessory 220 to PMD 202. The parameter or payload of this command can include an alphabetical (or alphanumeric) character string (one or more characters) and can also include a category of information to be searched. In one embodiment, categories can include, e.g., track name, album name, and artist name. In response to this command, database engine 212 of PMD 202 searches the database for metadata of the specified category that begins with the specified character string. Thus, for example, a user can search for all tracks whose names start with the letter "A" or all artists whose names start with "Mich." (Searches can be case-sensitive or not as desired.) In some embodiments, the search can be performed within the context of any previously applied database selection. Thus, for instance, a user can first select a particular genre (using a database navigation command), then search within that genre for artists beginning with "Q."

(2) A RetDBIndexByAlpha command sent by PMD 202 to accessory 220 in response to a GetDBIndexByAlpha command. The payload of the RetDBIndexByAlpha command can include a listing of items (which may be tracks, artists, albums, etc. depending on the particular search) that were found in the database search; in one embodiment, each track can be represented in the listing by its UID. In another embodiment, the payload can include a starting index and count, if the records are indexed alphabetically.

In another embodiment, accessory 220 can support an alphabetical lookup of tracks stored on PMD 202 using the following commands, which can be implemented in addition to or instead of those described above:

(1) A GetDBAlphaCount command sent by accessory 220 to PMD 202. Like the GetDBIndexByAlpha command, the parameter or payload of this command can include an alphabetical (or alphanumeric) character string (one or more characters) and can also include a category of information to be searched. As with the GetDBIndexByAlpha command, database engine 212 of PMD 202 responds to the GetDBAlpha- Count command by searching the database for metadata of the specified category that begins with the specified character string. The search can be performed within the context of any previously applied database selection, as described above.

(2) A RetDBAlphaCount command sent by PMD 202 to accessory 220 in response to a GetDBAlphaCount command. The payload of the RetDBAlphaCount command can include a value indicating the number of matching records found in the search.

(3) A GetDBAlphaRec command sent by accessory 220 to PMD 202. After using a GetDBAlphaCount command to perform a search, accessory 220 can send the GetDBAlphaRec command to request information for one or more of the items found in the search. In one embodiment, the GetDBAlphaRec command includes parameters designating a starting index and a number of items for which information is requested; a special value can be used to indicate that information for all records is to be returned. In some embodiments, the GetDBAlphaRec can include a further parameter specifying a requested information type (e.g., as with other information-requesting commands described above); in other embodiments, the GetDBAlphaRec command is always used to request a name field, and a parameter specifying information type can be omitted.

(4) A RetDBAlphaRec command sent by PMD 202 to accessory 220 in response to a GetDBAlphaRec command. In one embodiment, a separate RetDBAlphaRec command is used to return information for each item requested; thus a single GetDBAlphaRec command can result in multiple RetDBAlphaRec commands. The payload or parameters of the RetDBAlphaRec command can include an index identifying the record as well as the requested information. Where the GetDBAlphaRec command specifies an information type, the payload or parameters of the RetDBAlphaRec command can also include an information-type identifier.

These commands can be used with any accessory whose user interface allows the user to input a character string to be searched.

Playback Control and Status

Other embodiments of the present invention relate to controlling playback operations of playback engine 210 of PMD 202 via accessory 220. In one embodiment, a PlayControl command can be sent by accessory 220 to PMD 202 to specify a desired new play state. The new play state can be specified via a command parameter value. The state can include play and pause, as well as options such as next track, previous track, next chapter, previous chapter, begin fast forward, begin rewind, end fast forward, end rewind, and the like. In response to the PlayControl command, playback engine 210 changes to the requested state; if playback engine 210 is already in the requested state, it can simply remain in that state. In some embodiments, PMD 202 returns an acknowledgement command to accessory 220 indicating whether the state command was successfully executed.

In one embodiment, the PlayControl parameter values can include one value that instructs playback engine 210 to toggle between play and pause states (i.e., if playing, go to pause state; if paused, go to play state) and additional values that instruct playback engine 210 to go to the play state or the pause state. The latter play control parameters can be used to avoid problems that can arise, e.g., if accessory 220 does not know the current play/pause state of playback engine 210.

In another embodiment, accessory 220 can request to be notified of changes in the state of playback engine 210. For example, a SetStatusNotification command can be sent by accessory 220 to PMD 202 to request notifications for various state-change events. In one embodiment, a bit mask is used to select the desired notifications from a list of possible notifications. Examples include notifications when playback starts (or resumes after pause), when playback pauses or stops, when playback engine 210 changes to a new track, when a media type associated with the currently playing track changes, when the track time increments (e.g., in seconds or milliseconds), whether lyrics or other supplemental content is available for a track, and so on. Each notification can be individually enabled or disabled. In one embodiment, the bit mask includes multiple bytes and a "short-form" command is also supported. In the short-form command, a bit mask having one byte can be used in place of the multi-byte bitmask to enable or disable all status notifications. For example, PMD 202 can interpret a SetStatusNotification command with a one-byte bit mask set to 0x00 as signaling "disable all" while interpreting the same command with a one-byte bit mask set to 0x01 signals "enable all." PMD 202 can respond immediately to a SetStatusNotification command with an acknowledgement. In addition, when an event occurs for which accessory 220 has requested notification, PMD 202 can send an EventNotify command to accessory 220; the payload can indicate which event occurred.

Further Embodiments

While the invention has been described with respect to specific embodiments, one skilled in the art will recognize that numerous modifications are possible. For instance, the commands and event sequences used to bring about a given interaction between an accessory and a PMD might be different from the particular commands and event sequences described herein. Any or all of the commands above may be implemented in any combination, optionally along with additional commands including, e.g., commands to navigate the database of the PMD or the like.

Several embodiments described above relate to preserving aspects of a current state of a PMD when the PMD connects to an accessory. Thus, for example, when a PMD connects to an accessory, the accessory can ascertain the current state of the database engine, including the currently selected media asset(s) as well as the navigational path that led to the current selection. The accessory can also ascertain the current state of the playback engine, including which (if any) tracks are currently queued for playback. As a result, the user can decide at any time to connect a PMD to an accessory that provides a remote user interface and expect that the accessory's interface will begin in the same state as the PMD had immediately prior to connecting.

The protocols described herein can be used with a wide range of PMDs and/or accessories; for example, the PMD and/or the accessory could have additional functionality such as the ability to receive broadcasts, to make and receive telephone calls, voice recorder capability, personal information management capability (e.g., calendar, contacts list, e-mail, etc.), and/or other functionality.

Embodiments of the present invention can be applied to a wide variety of media asset types, including music, spoken word (e.g., audio books, lectures), video (e.g., television, movies), still images, and others. Accordingly, any description herein that refers to songs, albums or other concepts generally associated with music should be understood as also applicable to other media types. For example, a track can correspond to a song; an episode of a television series; a podcast; a portion (or all) of an audio book, lecture, or movie; and so on. An "artist" can correspond to the performer of a track, reader or author of an audio book, star of a television show, etc. An "album" can correspond to any collection of related tracks, such as a season of a television series, an audio book that is broken into multiple tracks, and so on. Thus, the invention is not limited to music but can apply to any type of media asset that can be stored and played or displayed.

Embodiments of the present invention can be realized using any combination of dedicated components and/or programmable processors and/or other programmable devices. While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible device, or the program code may be provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method of operating an accessory to communicate with a portable media device, the method comprising, by the accessory:
   establishing a first connection to a portable media device;
   during the first connection to the portable media device, obtaining and caching information, including media asset metadata, from a database stored in the portable media device;
   ending the first connection to the portable media device;
   establishing a second connection to the portable media device; and
   during the second connection to the portable media device:
      obtaining, from the portable media device, database synchronization information related to a most recent update of the database in the portable media device, wherein the database synchronization information is generated when the portable media device is connected to a host computer;
      determining, based on the database synchronization information, whether the most recent update of the database occurred after the first connection to the portable media device ended; and
      in the event that the most recent update of the database occurred after the first connection to the portable media device ended, invalidating at least a portion of the cached information.

2. The method of claim 1 further comprising, during the second connection to the portable media device:
   providing a remote user interface for the portable media device in a user interface of the accessory,
   wherein in the event that the most recent update of the database did not occur after the first connection to the portable media device ended, providing the remote user interface includes using the cached database information.

3. The method of claim 1 wherein the database synchronization information includes a synchronization identifier that changes each time an update of the database in the portable media player occurs.

4. The method of claim 1 wherein the database synchronization information includes one or more of:
   date and time information indicating when the database in the portable media player was most recently updated; or
   asset count information indicating a total number of media assets currently stored in the database in the portable media player.

5. The method of claim 1 further comprising:
   during the first connection to the portable media device, obtaining and storing a first value representing the database synchronization information,
   wherein determining whether the most recent update of the database occurred after the first connection to the portable media device ended includes obtaining from the portable media device a second value representing the database synchronization information and comparing the first value to the second value.

6. An accessory for providing a remote user interface for a portable media device, the accessory comprising:
   an input/output interface configured to exchange commands and data with the portable media device;
   a cache configured to store information obtained from the portable media device via the input/output interface, the stored information including metadata pertaining to a media asset stored on the portable media device and cached database synchronization information specific to a particular instance of a synchronization operation between the portable media device and a host computer; and
   a controller coupled to the input/output interface and the cache, the controller being configured to:
      detect a connection of the portable media device to the input/output interface; and
      obtain from the portable media device, in response to detecting the connection, current database synchronization information specific to a most recent instance of the synchronization operation between the portable media device and the host computer.

7. The accessory of claim 6 wherein the database synchronization information includes a synchronization identifier that changes each time an update of the database in the portable media player occurs.

8. The accessory of claim 6 wherein the database synchronization information includes one or more of:
   date and time information indicating when the database in the portable media player was most recently updated; or
   asset count information indicating a total number of media assets currently stored in the database in the portable media player.

9. The accessory of claim 6 further comprising:
   a user interface including at least one input control operable by a user,
   wherein the controller is coupled to the user interface and configured to detect a user input from the user interface and to direct the input/output interface to send a command to the portable media device in response to the user input.

10. The accessory of claim 6 wherein the controller is further configured to:
    retrieve the cached database synchronization information from the cache;
    determine, based on the current database synchronization information and the cached database synchronization information, whether the most recent instance of the synchronization operation occurred after the cached synchronization information was stored; and invalidate at least a part of the information stored in the cache in the event that the most recent instance of the synchronization operation occurred after the cached database synchronization information was stored.

11. The accessory of claim 10 wherein the controller is further configured to replace the cached database synchronization information with the current database synchronization information in the event that the most recent instance of the synchronization operation occurred after the cached database synchronization information was stored.

12. The accessory of claim 10 wherein the controller is further configured to use the metadata stored in the cache in the event that the most recent instance of the synchronization operation did not occur after the cached database synchronization information was stored and to request updated metadata from the portable media device in the event that the most recent instance of the synchronization operation occurred after the cached database synchronization information was stored.

13. The accessory of claim 6 wherein the controller is further configured to obtain the current database synchronization information using a plurality of commands exchanged via the input/output interface, wherein the plurality of commands includes:
a first command sendable by the accessory to the portable media device, the first command requesting database synchronization information from the portable media device, the database synchronization information pertaining to an update of a database of media assets stored in the portable media device; and
a second command receivable by the accessory from the portable media device, the second command providing the requested database synchronization information.

14. The accessory of claim 13 wherein the first command includes a parameter specifying a type of database synchronization information to be provided by the portable media device.

15. The accessory of claim 14 wherein the parameter specifies one or more types of database synchronization information selected from a plurality of available information types, wherein the plurality of available information types includes:
date and time information indicating when the database of media assets stored in the portable media device was most recently updated; and
asset count information indicating a total number of media assets currently stored in the database of media assets.

16. The accessory of claim 6 wherein the input/output interface comprises a wireless interface.

17. The accessory of claim 6 wherein the input/output interface comprises a connector.

18. A method of operating a portable media device, the method comprising:
updating a database of media assets stored on the portable media device by connecting the portable media device to a host computer;
determining database synchronization information associated with updating of the database;
subsequently to updating the database, establishing a connection to an accessory;
receiving from the accessory a request for the database synchronization information; and
providing to the accessory the updated database synchronization information.

19. The method of claim 18 wherein the database synchronization information includes a synchronization identifier and wherein updating the database synchronization information includes changing the synchronization identifier.

20. The method of claim 18 wherein the database synchronization information includes a plurality of information items, the plurality of information items including:
date and time information indicating when the act of synchronizing with the host computer occurred; and
asset count information indicating a total number of media assets stored by the portable media device after the synchronization operation.

21. The method of claim 20 wherein the request received from the accessory specifies which one or more of the information items is requested.

22. A portable media device for use with an accessory, the portable media device comprising:
a storage device configured to store a database of media assets and metadata associated with the media assets;
a database engine configured to access the metadata on the storage device;
a playback engine configured to play media assets stored on the storage device;
an input/output interface configured to exchange commands and data with an accessory; and
control logic coupled to the database engine, the playback engine, and the input/output interface, the control logic being configured to:
update the database during a first connection with a host computer;
update database synchronization information associated with the update of the database;
establish a second connection to an accessory via the input/output interface;
receive from the accessory, via the input/output interface, a request for the database synchronization information; and
provide to the accessory, via the input/output interface, the updated database synchronization information.

23. A portable media device for use with an accessory, the portable media device comprising:
a storage device configured to store a database of media assets;
an input/output interface configured to exchange a plurality of commands with the accessory,
wherein the plurality of commands includes:
a first command receivable from the accessory by the portable media device, the first command requesting database synchronization information from the portable media device, the database synchronization information pertaining to an update of the database of media assets, wherein the update of the database is performed when the portable media device is connected to a host computer; and
a second command sendable by the portable media device to the accessory, the second command providing the requested database synchronization information.

24. The portable media device of claim 23 wherein the first command includes a parameter specifying a type of database synchronization information to be provided by the portable media device.

25. The portable media device of claim 24 wherein the types of database synchronization information include at least one of:
a synchronization identifier that changes whenever the database of media assets is updated;
date and time information indicating when a most recent update to the database of media assets occurred; or
asset count information indicating a total number of media assets stored in the database.

* * * * *